United States Patent
Backer

(10) Patent No.: US 7,673,305 B2
(45) Date of Patent: Mar. 2, 2010

(54) SYSTEM AND METHOD OF EXPEDITING CERTAIN JOBS IN A COMPUTER PROCESSING SYSTEM

(75) Inventor: Bryan L. Backer, Pasadena, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

(21) Appl. No.: 11/585,017

(22) Filed: Oct. 23, 2006

(65) Prior Publication Data
US 2008/0098395 A1  Apr. 24, 2008

(51) Int. Cl.
*G06F 9/46* (2006.01)

(52) U.S. Cl. ............... 718/103; 718/102; 718/104; 718/107

(58) Field of Classification Search ......... 718/100–103, 718/104, 107
See application file for complete search history.

(56) References Cited

U.S. PATENT DOCUMENTS

| | | | | |
|---|---|---|---|---|
| 5,528,513 A | * | 6/1996 | Vaitzblit et al. | 718/103 |
| 6,021,425 A | * | 2/2000 | Waldron et al. | 718/103 |
| 6,263,359 B1 | * | 7/2001 | Fong et al. | 718/103 |
| 6,353,844 B1 | * | 3/2002 | Bitar et al. | 718/102 |
| 7,142,321 B2 | * | 11/2006 | Tomita et al. | 358/1.15 |
| 7,448,036 B2 | * | 11/2008 | Brenner et al. | 718/103 |
| 2006/0190943 A1 | * | 8/2006 | Haeri | 718/103 |

OTHER PUBLICATIONS

Rau et al., "Adaptive CPU Scheduling Policies for Mixed Multimedia and Best-Effort Workloads", IEEE 1999, pp. 1-11.*

Aman et al., "Adptive Algorithms for Managing a Distributed Data Processing Workload", IBM Journal, 1997, pp. 1-36.*

* cited by examiner

*Primary Examiner*—Meng-Ai An
*Assistant Examiner*—Jennifer N To

(57) ABSTRACT

In one embodiment, jobs requiring short processing time are given preference over jobs requiring long processing time by processing to completion all jobs for the first N seconds of the job. Jobs requiring longer than N seconds to complete are given a lower priority than a newly arriving job can and continue being processed, but are subject to reduction in resources by new jobs as each new job arrives.

2 Claims, 2 Drawing Sheets

SYSTEM AND METHOD OF EXPEDITING CERTAIN JOBS IN A COMPUTER PROCESSING SYSTEM

FIELD OF THE INVENTION

This invention relates to computer processing systems and more particularly to systems and methods for expediting certain jobs in a computer processing system.

DESCRIPTION OF RELATED ART

In certain computer processing systems there are workloads (jobs) that have long processing time and certain jobs that process quickly. Since the short running jobs are those upon which humans are typically waiting, it enhances productivity if the quick processing jobs are handled in a queue separate from the long jobs.

For example, in a circuit or chip design simulation environment there are some simulations having a long processing time and thus a user will typically either run these jobs over night or at least will not expect the job to complete for a long period of time. Thus, these long running jobs are not sensitive to latency, that is, if they finish in 10.1 hours instead of 10 hours, nobody is inconvenienced.

Other jobs, however, are quick compiles of designs or simulations, for example, of a small section that an engineer is working on. The results of that short job are usually key to the next design step that the designer needs to perform. Quicker turnaround of this job then results in greater efficiency of the designer. Clearly, short jobs should be given preference over long jobs, but without sophisticated code or elaborate queuing systems, it is not always clear at job launch time which jobs will run quickly and which jobs are long running jobs.

One prior solution to this problem is for the user to establish separate queues (one for a short running job and one for a long running job). This works if jobs are correctly entered, but leaves significant room for abuse or simple mistakes. Also, this system limits the pool of running jobs to a set ratio of short to long, which may need to change over time. Another system is to only run long jobs at night. This reserves the computer-system for short jobs during the day, but leaves computer-resources unused if the short jobs do not use up all of the CPU (or other resource) capacity.

BRIEF SUMMARY OF THE INVENTION

In one embodiment, jobs requiring short processing time are given preference over jobs requiring long processing time by processing to completion all jobs for the first N time period (usually seconds) of the job. Jobs requiring longer than N time period to complete are given a lower priority than a newly arriving job and can continue being processed, but are subject to reduction in resources as newer jobs as such newer jobs arrive.

In one embodiment, long jobs are stopped when new jobs arrive and resume with short jobs finish. Medium and long jobs are done in FIFO order if no new short jobs arrive. This would be very beneficial to short jobs, but would be very detrimental to the long jobs' overall performance as stopping a job entirely may have many undesirable side effects.

In another embodiment, the system controls processing levels to control priority of the individual jobs.

In still another embodiment, jobs are moved to workload management (WLM) groups, which represent a pool of CPU resources shared by jobs in the group. Resizing the pool (as jobs are added or finished) has immediate effects on the job's resource use and runtime, but not the negative side effects of stopping the job or offers more control than adjusting levels individual priority levels.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
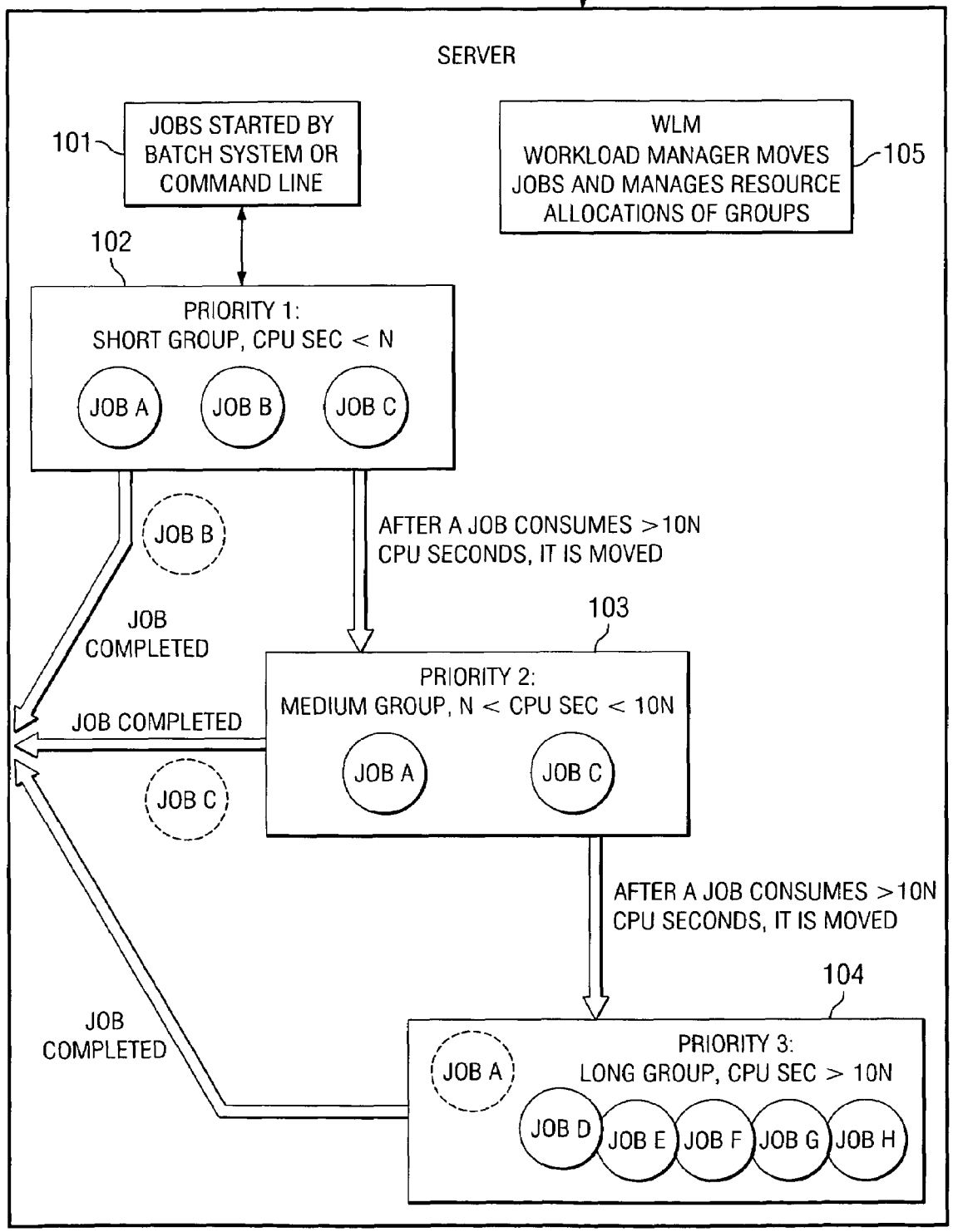
FIG. 1 illustrates one embodiment of a system for expediting certain jobs in a computer system.

FIG. 1 illustrates one embodiment 10 of a system for expediting certain jobs in a computer system. Embodiment 10 is a batch processing system in which a group of jobs are started at the same time. However, the concepts discussed herein will work for systems in which jobs are presented sequentially.

In embodiment 10, workload manager (WLM) 105 maintains separate resource pools for processing work jobs. As shown, there are three such pools, with pool 102 being a high priority group pool, i.e., pool 102 contains jobs that have not consumed more than N seconds of CPU time. In one embodiment, processing jobs in this manner (i.e., high priority jobs) are sized by WLM (between 10 and 80% of CPU allocation) based on actual CPU consumption. If the jobs want more processing they get more subject to, for example, a 10% minimum and 80% maximum of CPU allocation across all CPUs in the machine.

Pool 103, in the embodiment, is a medium priority group pool such that any job in the pool has consumed more than N CPU time, but less than, say, 10N CPU time. The medium pool, for example, is sized (between 10 and 80% of CPU allocation) based on actual consumption subject to what the short pool has already taken. If the jobs want more processing, and more is available, they get more subject to only the, for example, 10% minimum and 80% maximum of CPU allocation. Thus, if the short pool is using 50% of the processing capability then only 40% is available to the medium group (and 10% for the long jobs' minimum as will be discussed).

An optimization would be to reduce the medium and long group from 10% minimums to 1%, or to only enforce the minimum allocation if there are jobs in any group requiring processing. For the minimum equals 10% case the following chart would apply.

| Group | Min | Effective Max |
| --- | --- | --- |
| Short | 10 | 80 |
| Medium | 10 | 80 − (short_allocation − 10) |
| Long | 10 | 80 − ((short_allocation − 10) + (medium_allocation − 10)) |

Pool 104 is a low priority group pool such that any job in the pool has consumed more than 10N of CPU time. In this case, for example, the short and medium groups get the processing they need first, then the long group gets what is left. Thus, the 80% only happens when the short group and medium group are relatively idle.

Data collector scripts are called by the WLM daemon process to watch CPU seconds of individual job processes. The data collector program moves the jobs onto the next group if it accumulates enough CPU time to cross the job (or group) threshold.

All jobs are started in short group 102 where they run for the first N CPU seconds. After N CPU seconds, if a job has not completed it is moved to a lower priority group. If the lower priority job accumulates a second threshold of CPU time, such as 10N seconds, it is placed in the lowest priority group (pool 104). This method allocates CPU resources first to running short length jobs, then to medium length jobs, then to long jobs. Medium and long jobs have a minimum resource allocation, such as 10%, so these jobs continue to be processed even if there are many short jobs running.

Note that the N value for the initial threshold times (and the value 10N) can be set (and changed from time to time) by the user or if desired by WLM 103 monitoring the system and making adjustments according to a plan. A reasonable default would be, for example, 10 min. Also note that priority levels can take into account resources other than just CPU and could include, for example, memory, disk IO, coprocessors, etc.

Note that the jobs do not need to be instrumented, and the users do not have to worry about special short or long queue submission commands. In fact, the users do not even have to know how long their job will take since if it is a short job it is automatically expedited.

In operation, as shown in FIG. 1, job B is a short job (i.e., it has processed in less than, say, 10 minutes and has completed prior to the end of N seconds. Jobs A and C did not complete within N seconds and thus have been moved to medium priority group 103. Job C completes within this period (between time N and, say, time 10N). Job A has not completed within time 10N and thus is moved to the lowest priority in group 104 where job A joins other long running jobs D, E, F, G, H.

Note that the time N and the time 10N are arbitrary, as is the number of priority levels.

Figure 2:
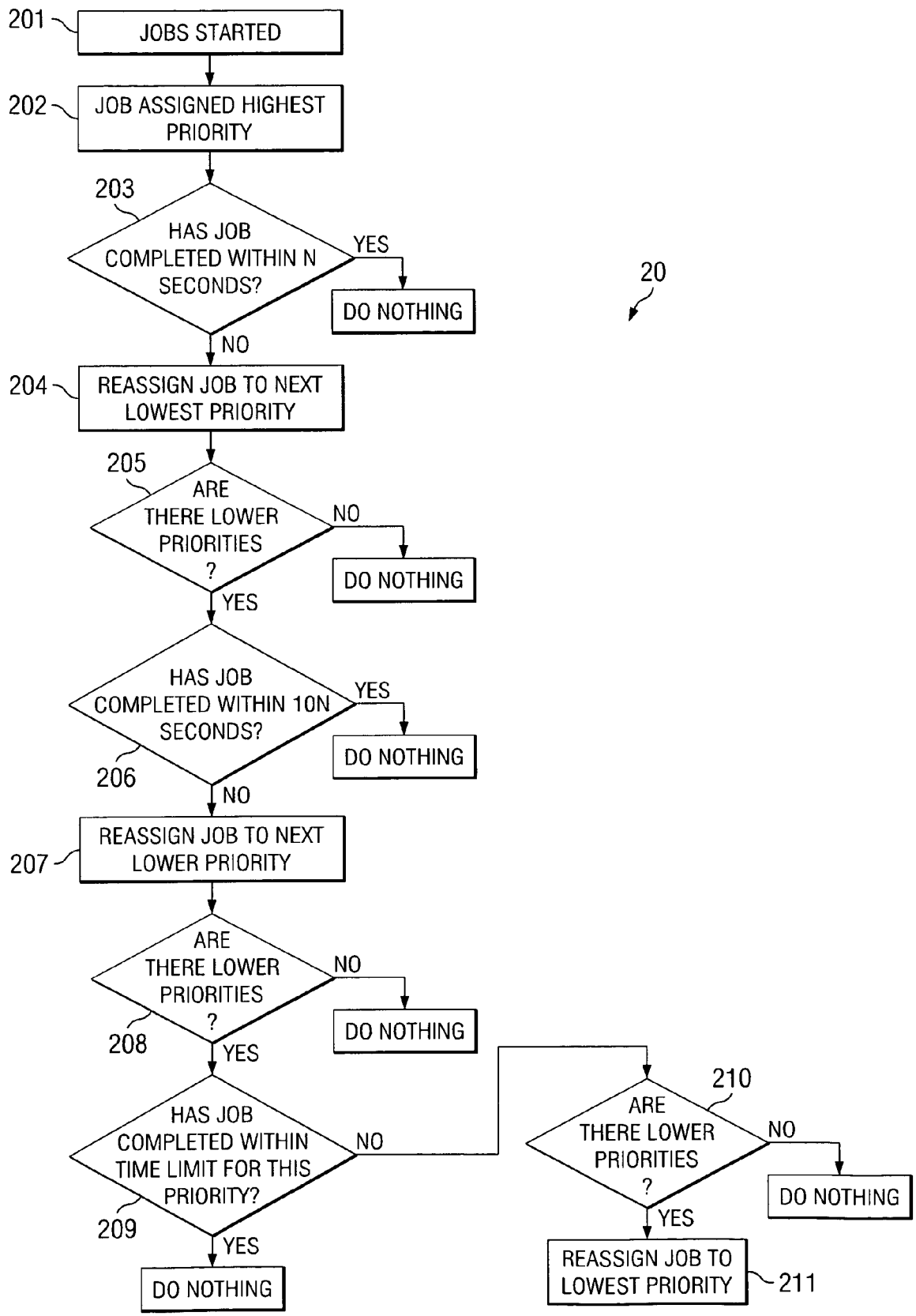
FIG. 2 illustrates one embodiment of a method for processing certain jobs to completion ahead of earlier started jobs.

FIG. 2 illustrates one embodiment of a method for processing certain jobs to completion ahead of earlier started jobs.

As shown in embodiment 20, process 201 begins a job, or a batch, and process 202 assigns the job the highest priority. This means that an established maximum amount of resources are assigned to the job. For single resource systems, the single resource, usually a CPU, is assigned to that job and the CPU would not be processing another job in the system. Alternatively, the CPU can process the new job for say 80% of its time while devoting the other 20% to jobs having lower priorities.

Process 203 determines if the new job has been processed to completion within N seconds. As discussed, N is an arbitrary time period and can be, if desired, adjusted from time to time. If it has the job is, by definition, competed and nothing further need be done. If the job has not completed, process 204 assigns it to a lower priority and it is processed either after all new jobs (jobs holding higher priority) are complete or during the, say 20% of CPU time set aside for lower priority jobs.

If there are one or more intermediate priority levels then processes 205, 206, 207, 208, 209, 210 and 211 continue to move the job to lower and lower priority status if the job has not completed within each defined time. Note that the system should be designed such that even at the lowest priority a job will make reasonable progress towards completion regardless of how many other new or higher priority jobs arrive in the system. This is accomplished by being sure that all priority levels receive some minimum amount of resource time.

What is claimed is:

1. A The method of expediting jobs in a computer processing system, said method comprising:

processing by a workload manger a plurality of incoming jobs in sequence of arrival;

separating each of said plurality of incoming jobs to at least one or more groups by locating in a first priority group from the at least one or more groups, jobs that comprise a processing completion time N;

reassigning any of said processing job of said plurality of jobs into a second priority group from the at least one or more groups, if an of said processing job of said plurality of jobs in said first priority group is not completed within said processing completion time N, wherein said second priority group is a lower priority than said first priority group and comprises a processing completion time M that is greater than N;

allowing at least one subsequent incoming job to be processed, ahead in a higher priority group than any said processing job of said plurality of jobs not processed to completion within said processing completion time N; and processing said plurality of jobs that have not completed by the end of said processing completion time N for a further time period of said processing completion time M, said jobs being processed during said time N being processed with more allocated resources than said plurality of jobs that have not processed to completion during said time N.

2. The method of claim 1 further comprising:

processing to completion using diminished resources for all reassigned jobs which have not processed to completion within said processing completion time N.

* * * * *

UNITED STATES PATENT AND TRADEMARK OFFICE
CERTIFICATE OF CORRECTION

| | | |
|---|---|---|
| PATENT NO. | : 7,673,305 B2 | Page 1 of 1 |
| APPLICATION NO. | : 11/585017 | |
| DATED | : March 2, 2010 | |
| INVENTOR(S) | : Bryan L. Backer | |

It is certified that error appears in the above-identified patent and that said Letters Patent is hereby corrected as shown below:

In column 4, line 18, in Claim 1, after "A" delete "The".

In column 4, line 28, in Claim 1, delete "an" and insert -- any --, therefor.

Signed and Sealed this

Twenty-seventh Day of July, 2010

David J. Kappos
*Director of the United States Patent and Trademark Office*